Feb. 19, 1963  A. E. HILLIKER  3,078,440
MINOR MOVEMENT CONTROLLER
Filed March 1, 1960  11 Sheets-Sheet 1

FIG—1

INVENTOR.
Arthur E. Hilliker

BY D. Emmett Thompson

ATTORNEY

FIG. 2

INVENTOR.
Arthur E. Hilliker
BY D. Emmett Thompson
ATTORNEY

Feb. 19, 1963 A. E. HILLIKER 3,078,440
MINOR MOVEMENT CONTROLLER
Filed March 1, 1960 11 Sheets-Sheet 4

FIG. 4

INVENTOR.
Arthur E. Hilliker
BY D. Emmett Thompson
ATTORNEY

FIG__11

3,078,440
MINOR MOVEMENT CONTROLLER
Arthur E. Hilliker, Pulaski, N.Y., assignor to Crouse-Hinds Company, Syracuse, N.Y., a corporation of New York
Filed Mar. 1, 1960, Ser. No. 12,157
7 Claims. (Cl. 340—35)

This invention relates to and has as an object a new and improved minor movement traffic controller operable in conjunction with parent or master controller for controlling the movement of traffic at an intersection. The minor movement controller may be used to control a vehicular traffic movement such as a left-turn movement, or the vehicular traffic movement through the intersection on a minor or additional street. Similarly, a minor movement controller may also be used to control the movement of the pedestrians at the intersection.

Minor movement controllers heretofore have been set up to operate in conjunction with master or parent controllers in a manner whereby the movement controlled by the minor movement controller could receive the right-of-way signal display only after the master controller had been cycled to present the right-of-way signal display to a particular one of the movements controlled by the master or parent controller. This operation is objectionable for the reason that it is oftentimes unnecessary to present such a signal display to any of the movements controlled by the master controller prior to the presenting of the signal display to the minor movement.

Accordingly, it is a principal object of this invention to provide an actuated minor movement controller which may be arranged to have a non-selective operation in conjunction with a master or parent controller wherein the right-of-way signal display will be transferred by the minor movement controller from the right-of-way signal display on which the master controller is resting immediately without the master controller cycling to present the right-of-way to any of the other movements controlled by the master controller.

It is a further object of this invention to provide a minor movement controller having a selective operation in conjunction with a parent controller wherein the right-of-way signal display is presented to the minor movement only after the right-of-way signal display has been presented to a predetermined movement controlled by the master controller and to return the right-of-way signal display to a second predetermined movement controlled by the master controller.

It is a further object of this invention to provide a minor movement controller which may be arranged to selectively operate in conjunction with a master controller so as to present the right-of-way signal display to the minor movement until the master controller calls for the right-of-way signal display to one of the movements controlled by the master controller.

It is another object of this invention to provide a minor movement controller which may be arranged to selectively operate in conjunction with a master controller so as to always return the right-of-way signal display from the movements controlled by the master controller to the minor movement.

Briefly described, the minor movement controller of this invention when arranged to be non-selective will operate in response to a traffic actuation on the minor movement or by a pedestrian push button if the controller is arranged to control pedestrian traffic so that the right-of-way signal display will be transferred to the minor movement immediately following the clearance signal display presented by the master controller to the particular movement on which the controller is resting at the time of the minor movement actuation. Upon completion of the minor movement controller cycle, during which the right-of-way signal display is presented to the minor movement, the master controller will transfer the right-of-way to any of the other movements controlled by the master controller except the movement on which the master controller was resting prior to the operation of the minor movement controller.

The minor movement controller may be rendered operative to be selective so that the right-of-way signal display on the minor movement will follow the right-of-way signal display to a specific pre-selected movement controlled by the master controller and will precede another specific pre-selected movement of the master controller.

Finally, the minor movement controller may be arranged to stop after it has presented the proceed signal display to the minor movement until there is a call on one of the movements controlled by the master controller and in this connection the minor movement controller may also be arranged to return the right-of-way signal display to the minor movement after the calls on the movements controlled by the master controller have been satisfied.

The invention consists in the novel features and in the combinations and constructions hereinafter set forth and claimed.

In describing this invention, reference is had to the accompanying drawings in which like characters designate corresponding parts in all the views.

In the drawings, the minor movement controller comprising a preferred embodiment of the invention is shown, by way of example, as being connected to a full actuated three-movement master controller for operation in conjunction therewith. A three-movement full actuated master controller is one which functions to control any combination of three vehicular and/or pedestrian traffic movements wherein each of the movements is provided with detection means which serve when actuated to operate the controller. Normally, the master controller is arranged so that it will rest on any of the movements last receiving a detector actuation, presenting the proceed signal indication to that movement. When a detection is received on either of the other two movements, the controller will be cycled so as to present the proceed indication to that movement. This type of master controller comprises no part of this invention and is shown in connection with the minor movement controller comprising this invention only by way of example. It is to be understood, therefore, that the master full actuated three-movement controller is not intended to be limiting in any manner and the minor movement controller comprising this invention may be also used in conjunction with any full actuated multi-movement master controller, as well as semi-actuated multi-movement controllers.

Figure 1:
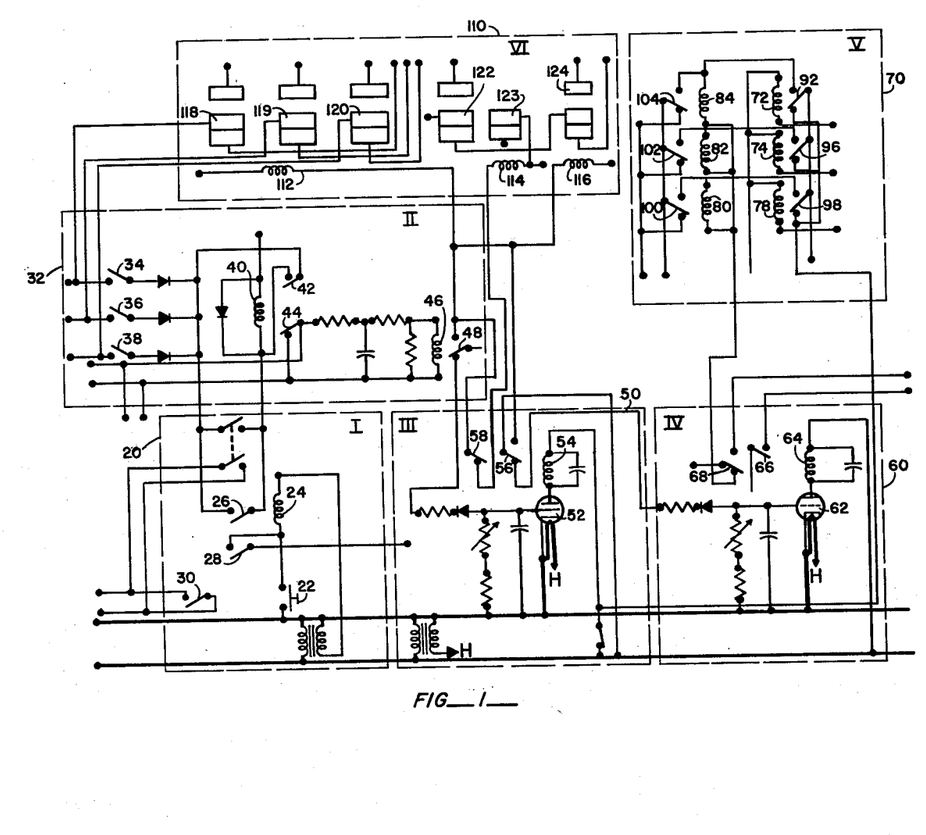
FIGURES 1 to 11, inclusive, are circuit diagrams of a minor movement controller comprising a preferred embodiment of the invention wherein the heavy lines in each figure indicate the portion or portions of the circuit then conducting current.

The minor movement controller, as best seen in FIGURE 1, consists of six sections, each enclosed by dashed line boxes.

Section I, indicated by the dashed line 20, comprises a detector circuit operable upon actuation to initiate the operation of the controller. This section includes a vehicle detector or pedestrian push button 22, as the case may be, a relay generally indicated at 24 having three sets of normally open contacts 26, 28 and 30.

Section II, generally indicated by the dash line 32, is a selector circuit comprising three selector switches 34, 36 and 38, a relay generally indicated at 40, having two sets of contacts 42 and 44, and a relay generally indicated at 46, having a single set of contacts 48.

Section III, generally indicated by the dash lines 50, is a first resistance-capacitance type timer of the type well known in the art having an electron tube 52 and a relay, generally indicated at 54, having a pair of contact sets 56 and 58.

Section IV, generally indicated by the dash lines 60, comprises a second resistance-capacitance timer having an electron tube 62, a relay 64 having two sets of contacts 66 and 68.

Section V, generally indicated by the dash lines 70, is a permissive circuit comprising six relays 72, 74, 78, 80, 82 and 84, each of the relays 72 to 84, inclusive, having a set of contacts 92 and 104, inclusive.

Section VI, generally indicated by the dash lines 110, is a load relay section comprising three relays, generally indicated at 112, 114 and 116, the relay 112 having three sets of contacts, 118, 119 and 120, the relay 114 having two sets of contacts 122 and 123, and the relay 116 having a single set of contacts 124.

Non-Selective Operation

Briefly described, when switches 34, 36 and 38 are closed the minor movement controller is rendered non-selective in its operation and when the detector 22 is actuated, the parent controller will be cycled from the proceed indication on the movement in which it is resting to present the clearance signal to that movement. Thereupon, the selector circuit will suspend the operation of the master controller and will change the signal display on the aforesaid movement controlled by the master controller from clearance to stop, and from stop to proceed on the movement controlled by the minor controller. Similarly, the selector circuit energizes the timer of section III to control the length of the interval during which the proceed signal is displayed to the minor movement. Upon completion of that interval, the timer of section III functions to change the signal display on the minor movement from proceed to clearance and energizes the timer of section IV. The timer of section IV then times the interval of the clearance signal display to the minor movement and upon completion thereof changes the signal display to stop on the minor movement. At this time, the permissive circuit of section V becomes operable to sample the movements controlled by the master controller which suspends any further operation of the minor movement controller until the calls on the movements of the master controller have been satisfied. Thereafter, if there have been additional actuations of the detector 22 of the detector circuit 20 of section I, the minor movement controller will again be cycled in the manner just described to again present the right-of-way signal display to the minor movement.

This non-selective operation of the minor movement controller will now be described in detail with reference to FIGURES 1 to 9, inclusive.

Figure 2:
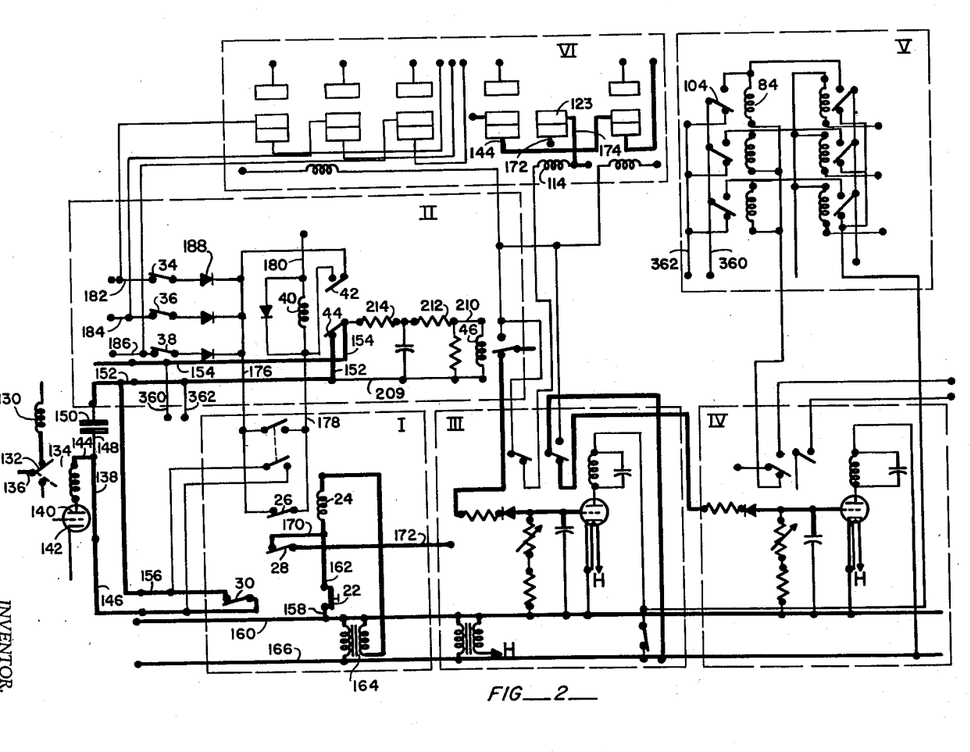

Referring now to FIGURE 2, the minor movement controller of FIGURE 1 has been shown in conjunction with a portion of the master controller indicated at the left of FIGURE 2.

The master controller includes a cam unit operating motor coil 130 connected through the armature 132 of relay 134 to a 115 volt 60 cycle hot line 136. The coil 138 of the relay 134 is connected to the plate 140 of the main electron control tube 142 of the master controller whereby when the master controller is cycling the tube 142 is conducting current and the coil 138 of relay 134 will be energized to connect the hot line 136 through the armature 132 to the cam motor coil 130. This portion of the master controller is common to both full and semi-vehicle actuated controllers and is shown for example in the co-pending application of Jeffers Ser. No. 757,778, filed August 28, 1959 and assigned to the assignee of the present application.

The opposite side of the coil 138 is connected by line 144 to the line 146 for a purpose to be hereinafter described. The coil 138 of relay 134 is also connected by a line 148 through the open stop contacts 150 on the master controller cam unit to the line 152 of the selector circuit which is normally connected through contacts 44 of relay 40 by line 154 to a hot feed for a purpose to be hereinafter described. Line 152 is connected to line 156 of the detector circuit of section I, also for a purpose to be hereinafter described.

The detector 22 is connected by a line 158 to the common side 160 of a 115 volt 60 cycle power supply and the opposite side of detector 22 is connected by line 162 through the coil of relay 24 to the secondary of a 12 volt transformer 164, the primary of which is connected across the common line 160 to the hot line 166 of the power supply.

As seen in FIGURE 2 when the detector 22 is actuated power is supplied to the coil of relay 24 from the secondary of the transformer 164 through line 162, coil of relay 24 and detector 22, line 158 to the common 160 of the power supply thus energizing the relay 24. The energization of relay 24 closes the normally open contacts 26 and 28 and 30, as shown in FIGURE 2. The contacts 30 thus connect a circuit from the control tube 142 of the master controller through the coil 138 of relay 134, line 144, line 146, contacts 30, line 156, line 152, contacts 44 of relay 40, and line 154 to the hot feed thereby energizing relay 134. When the relay 134 is thus energized the armature 132 connects the cam motor coil 130 to the hot supply 136 thereby cycling the master timer out of the proceed signal display in which it was resting to one of the amber or clearance display intervals.

The middle contacts 28 of relay 24 continue to hold the relay 24 energized through a circuit comprising the secondary of transformer 164, line 162, the coil of relay 24, line 170, contacts 28, line 172 which is connected through the second set of normally closed contacts 123 of relay 114 to a ground line 174.

The upper set of contacts 26 of relay 24 connects the three selector switches 34, 36 and 38, which are closed for the non-selective operation of the controller to the relay 40 through the circuit comprising line 176, contacts 26, line 178, the coil of relay 40 and line 180 to ground. The selector switches 34, 36 and 38 are each connected to the amber or clearance terminals and to the line 176 by lines 182, 184 and 186, each of which lines includes a conventional rectifier 188 to rectify the voltage supply.

As the main or master controller cycles to amber one, two or three depending on where the controller was resting when the detector 22 was actuated current will flow through one of the lines 182, 184 or 186 and through one of the switches 34, 36 or 38.

Figure 3:
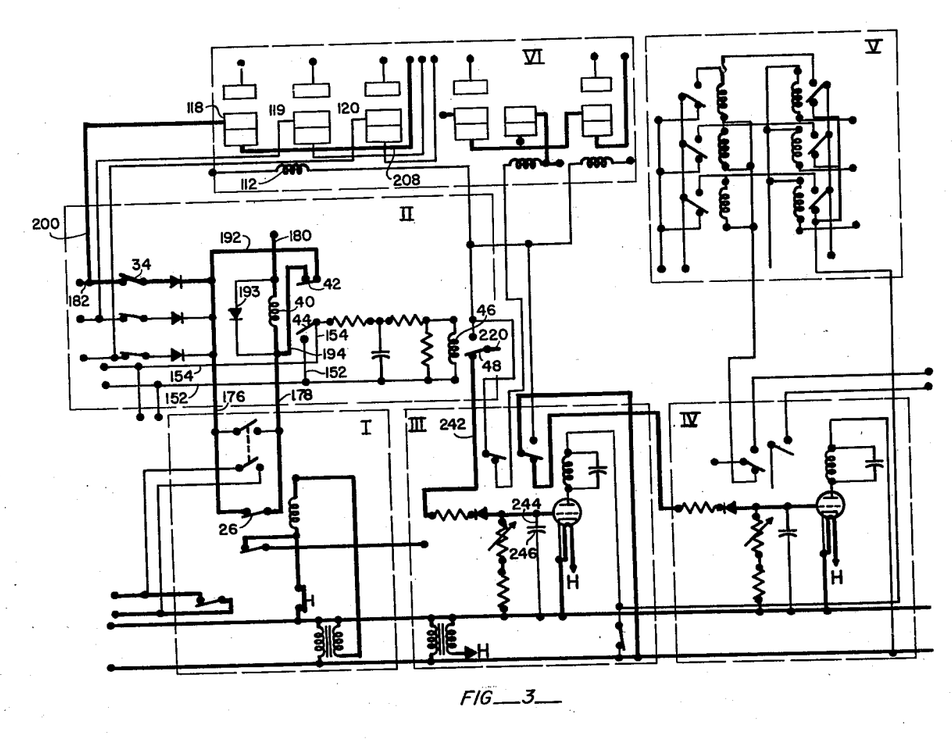

Referring to FIGURE 3 as an example, amber one has been selected as the clearance signal display to which the master controller has been cycled thereby supplying a hot feed to the amber one signal which in turn completes a circuit through line 182, switch 34, line 176, contacts 26, line 178, relay coil 40 and line 180 to ground thereby energizing relay 40.

When the hot feed is supplied by the master timer to line 182 the clearance signal of the first traffic movement is energized by the circuit comprising line 200, normally closed contacts 118 of relay 112 to line 208 which is connected to the clearance signal displayed to the number one traffic movement.

As relay 40 becomes energized its contacts 42 which are normally open are closed and hold the relay 40 energized through the circuit comprising line 182, switch 34, line 192, contacts 42, line 194, the coil of relay 40 and line 180 to ground. A filtering rectifier 193 is connected across the coil of relay 40 to renew contact chatter.

The lower normally closed contacts 44 of relay 40 open thus breaking the circuit described in connection with FIGURE 2 which cycles the master controller thereby stopping the master controller with contacts 150 closed.

Figure 4:
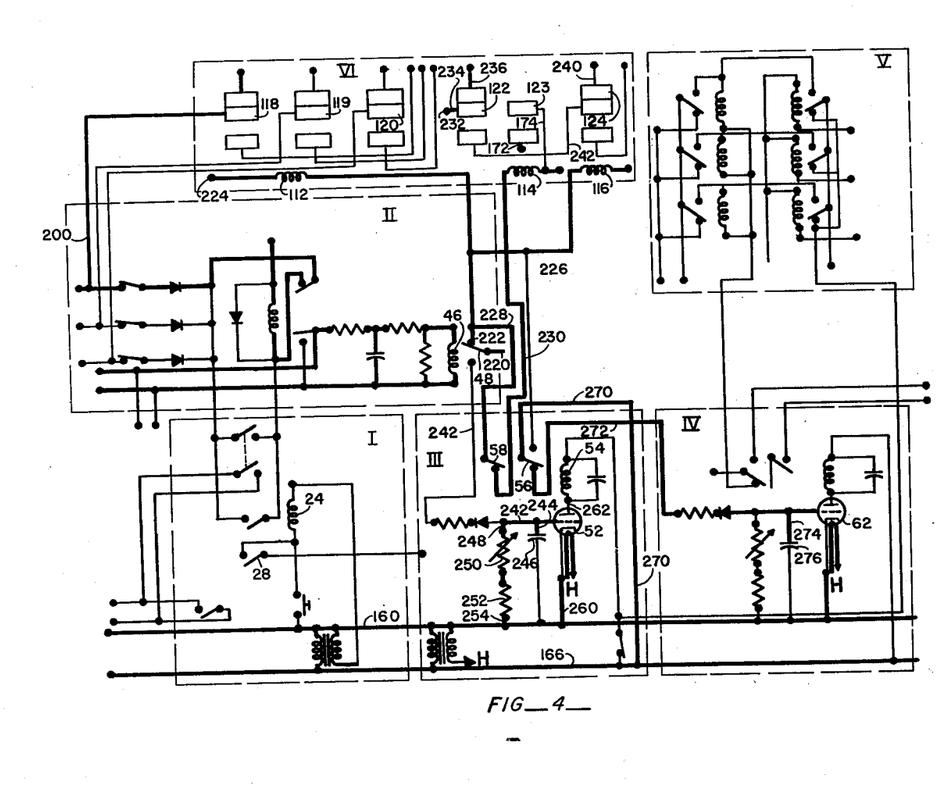

Referring now to FIGURE 4, it will be seen that when the main or master controller completes the timing of the clearance signal display interval current begins to flow in the main timer plate circuit described in connection with FIGURE 2. As will be seen by referring to FIGURE 2, the coil of relay 46 is connected in series with the master timer plate relay 134 through the circuit comprising electron tube 142, line 144, coil 138, line 148, stop contacts 150 which are now closed, line 152, line 209 the coil of relay 46, line 210 which is connected to the hot feed by line 154.

The relay 46 is a much more sensitive relay than the main timer plate relay 134 and will be energized on lower current. The resistors 212 and 214 in line 210 when added to the resistance of the coil of relay 46 insure the presence of enough resistance in the circuit just described to prevent the main timer relay 134 from being energized.

Upon energization of the relay 46, the contacts 48 are moved from the position shown in FIGURE 3 to the position shown in FIGURE 4. This connects a circuit from a hot feed through line 220 contact 48, line 222 and coil of relay 112, to a ground at 224 thereby energizing the relay 112. The contacts 118, 119 and 120 are thus moved from the position shown in FIGURE 3 to that shown in FIGURE 4 whereby the hot feed on line 200 is connected through the contacts 118 to the stop signal on the number one traffic movement to present the stop signal display to that movement.

Relay 116 is also energized by the energization of relay 46 through a circuit comprising the hot feed from line 220 contact 48, line 222, line 226 and the coil of relay 116 to ground thereby shifting the contacts 104 of relay 116 from the position shown in FIGURE 3 to the position shown in FIGURE 4.

At the same time relay 114 is energized through circuit comprising the hot feed from line 220, contact 48, line 222, line 228, the closed contacts 58 of relay 54, line 230 and the coil of relay 114 to ground.

Energization of relay 114 causes the contacts 122 to shift from the position shown in FIGURE 3 to that shown in FIGURE 4 whereby a hot feed at 232 is connected through line 234 and contacts 122 to line 236 which is connected first or to the proceed signal display of the minor movement. At this time the stop signal is displayed to movements one, two and three controlled by the master controller and the proceed signal is now being displayed to the movement controlled by the minor movement controller.

The energization of the relay 114 also breaks the circuit described in connection with FIGURE 2 from the ground connected to line 174 through the contacts 123 of the relay 114 thus breaking the connection with line 172 to the contacts 28 of relay 24 whereby de-energizing relay 24.

The energization of the relay 116 moves the contacts 104 thereof from the position shown in FIGURE 3 to the position shown in FIGURE 4 thus connecting the clearance signal which is connected to line 240 through the contacts 104 to line 242 which is open through the contacts 122 of the relay 114. No signal change is apparent through energization of relay 116 since the feed to the contacts 104 of relay 116 were broken by the energization of relay 114, as previously stated.

The energization of the relay 46 broke a charging circuit shown in FIGURE 3 from the hot feed 220 through the contact 48 and lines 242 and 244 to the timing capacitor 246 of the first timer shown in section III of FIGURE 1. As seen in FIGURE 4, the removal of the hot feed from the capacitor 246 permits the capacitor 246 to discharge through the circuit comprising line 244, line 242, line 248 and resistances 250 and 252 connected by line 254 to the ground side 160 of the power supply. This is a conventional resistance-capacitor timer and the discharge of the capacitor 246 renders the control tube 52 conductive upon completion of the discharge of the capacitor 246. Thus it will be seen that the period of time necessary for the capacitor 246 to completely discharge is the time interval that the proceed signal is displayed through the circuit previously described to the minor movement.

Figure 5:
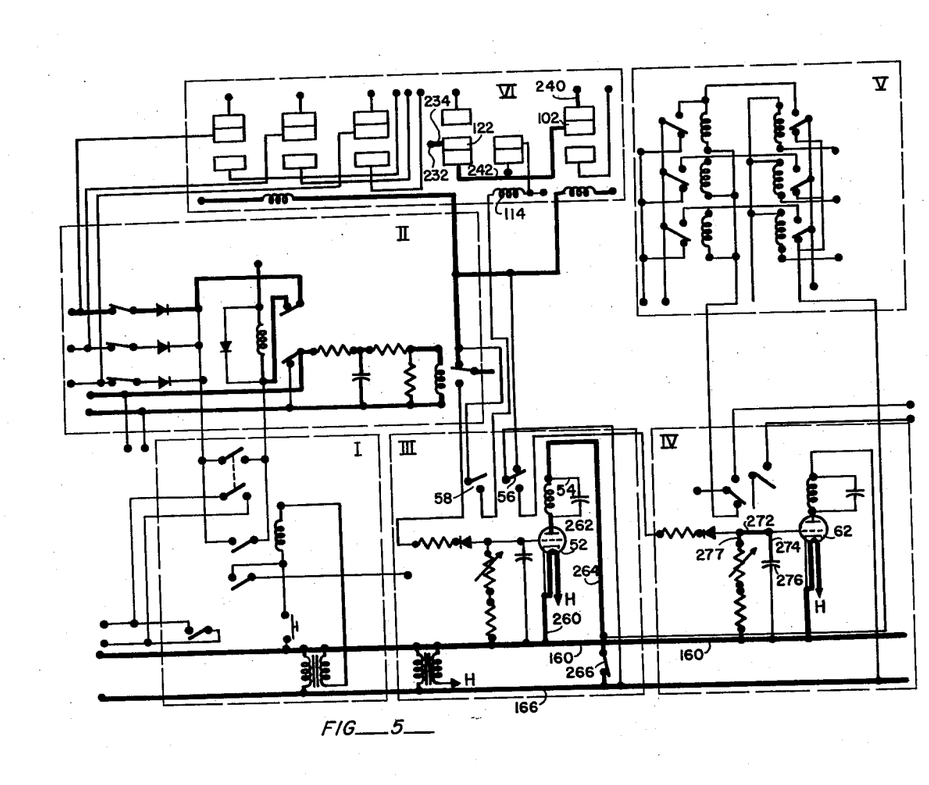

When the tube 52 becomes conductive a circuit shown in FIGURE 5 is connected through line 260 from the ground line 160, tube 52, line 262, the coil of relay 54 and line 264 which is connected through the normally closed cycling switch 266 to the hot side 166 of the power supply. The purpose of the cycle switch 266 will be described hereinafter.

Referring now to FIGURE 5 wherein the relay 54 is shown in the energized state, the contacts 56 and 58 of the relay 54 have moved from the position shown in FIGURE 4 to the position shown in FIGURE 5 thus breaking the circuit to relay 114 thereby de-energizing that relay. This, in turn, causes a hot feed to be connected from 232 through the line 234, contacts 122 of relay 114, line 242 and contacts 102 to line 240 which is connected to the record or clearance signal displayed to the minor movement thereby changing the signal display on the minor movement from proceed to clearance.

If the minor movement controller is used to control pedestrian traffic a "Walk—Don't Walk" type, pedestrian signal may be utilized and no signal change will be apparent on the signal between the first and second signaal periods, the "Walk" signal being energized during both the first and second signal periods or intervals.

Referring briefly to FIGURE 4, the contact 56 of relay 54 normally charges the timer of section four through a circuit comprising line 270, which is connected to the hot line 166 comprising contact 56, line 272 and line 274 to the charging capacitor 276 of the second timer. This prevents the second timer tube 62 from becoming conductive in the conventional manner.

Referring again to FIGURE 5, when the relay 54 is energized the contact 56 is moved from the position shown in FIGURE 4 to the position shown in FIGURE 5 thus breaking the charge circuit to the capacitor 276 just described. This permits the capacitor 276 to discharge through the circuit comprising line 274, line 272 and line 277 to the ground line 160. The length of time necessary to discharge the capacitor 276 to the point where the tube 62 becomes conductive times the length of the clearance display interval on the minor movement, as will be next described.

Figure 6:
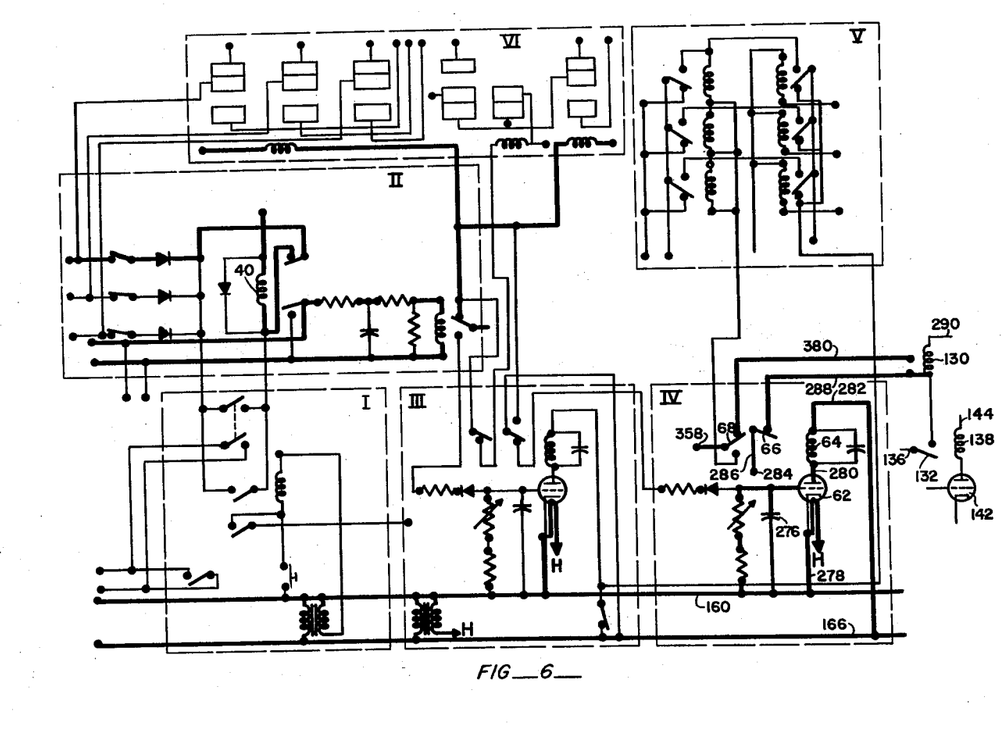

With reference to FIGURE 6, when the capacitor of the second timer has sufficiently discharged, tube 62 will be conductive through the circuit comprising line 278 connected to the ground supply line 160, tube 62, line 280 the coil of relay 64, line 282 to the hot side 166 of the power supply, thereby energizing the relay 64.

Shown to the right of FIGURE 6 is a portion of the master controller similar to that shown in connection with FIGURE 2. The energization of relay 64 moves contact 66 of relay 64 to the position shown in FIGURE 6. This connects a hot feed at 284 through line 286, contact 66, line 288 and the cam motor coil 130 of the master timer to a ground line 290. This, in turn, cycles the master timer cam unit to proceed signal indication of the next traffic movement controlled by the master controller.

When the master controller is cycled to the proceed signal of the next movement, the clearance circuit of the movement the minor movement controller followed which in the example set forth was movement one, will will become de-energized thereby in turn de-energizing relay 40.

This is shown in connection with FIGURE 7 wherein the hot feed has been removed from the line 182 by the master controller thus breaking the circuit described in connection wtih FIGURE 3 which energized the relay 40. The de-energization of the relay 40 in turn causes the relay contact 42 and 44 to return to their normal position thereby de-energizing the relay 46. This in turn causes the contact 48 of the relay 46 to return to its normal position thus placing a hot feed on and charging the capacitor 246 of the first timer. In addition, when the contacts 48 return to the position shown in FIGURE 7, the relay 116 is de-energized thus placing a hot feed on the stop signal displayed to the minor movement through the circuit comprising the hot feed 232, line 234, contacts 122, line 242, contacts 104 of relay 116 and line 292 which is connected to the third or stop signal displayed to the minor movement.

Figure 7:
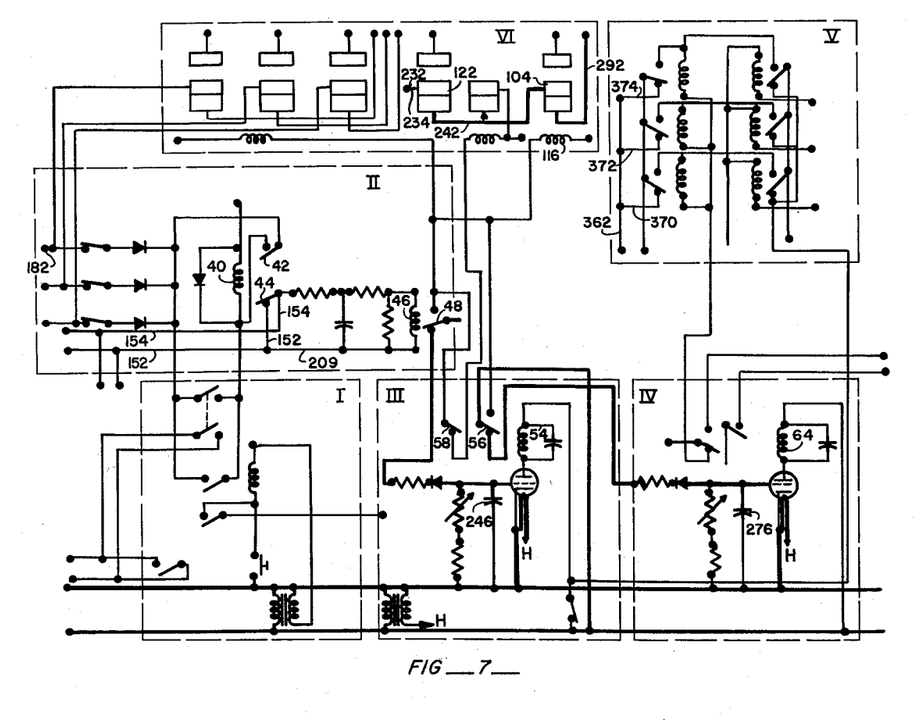

The recharging of the capacitor 246 of the first timer de-energizes the relay 54 and returns the contact 56 of the relay to the position shown in FIGURE 7, thus placing a hot feed on and charging the capacitor 276 of the second timer as previously described. This de-energizes relay 64 and breaks the circuit to the master controller motor 130 as described in connection with FIGURE 6.

This resets and recharges the Number 1 and Number 2 timers thus resetting the minor movement controller for the next time it comes into operation.

Figure 8:
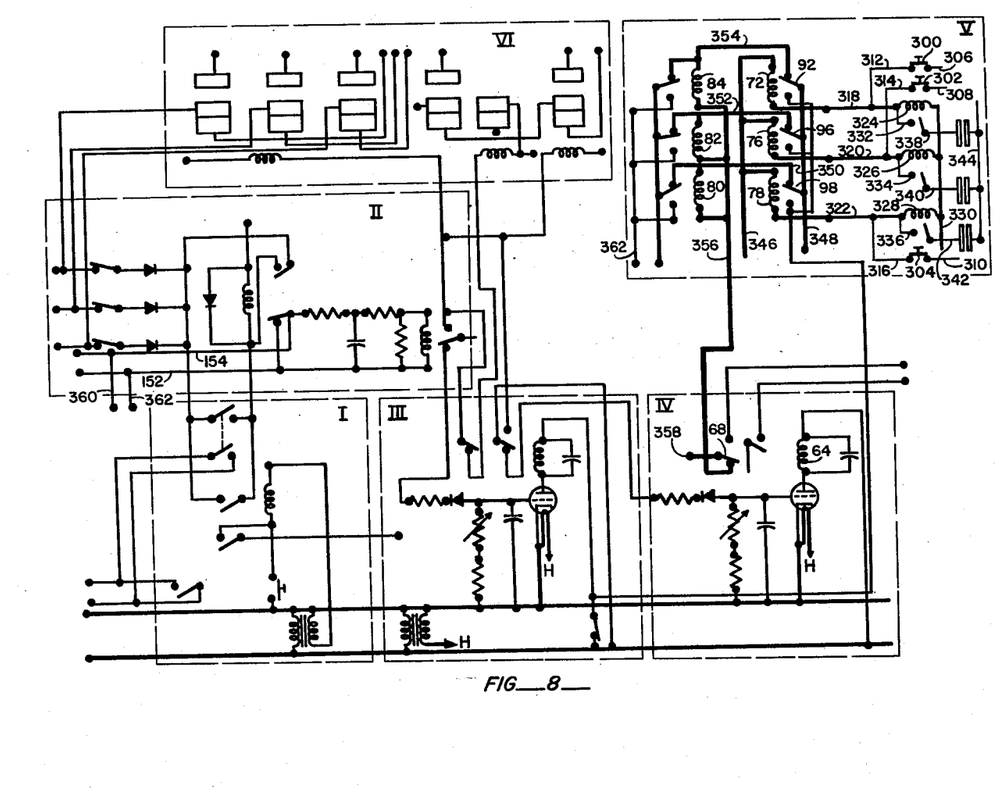

At the end of each complete operation of the minor movement controller the permissive circuit of section V samples the master controller detector circuits shown to the right of FIGURE 8 to determine when the minor movement controller can come into operation again.

The detector circuits of the three movement master controller shown to the right of FIGURE 8 comprises vehicle detectors 300, 302 and 304 placed in the streets of each of the three movements controlled by the master controller. One side of each of the detectors is connected to a ground by lines 306, 308 and 310 and the opposite side of each of the detectors is connected by lines 312, 314 and 316 to lines 318, 320, and 322 respectively, which are connected to the permissive circuit of section V. Each of the detector circuits includes a detector relay 324, 326 and 328 respectively, connected at one side to line 330 which is connected to a 12 volt hot feed. The opposite sides of the coils of the relays 324, 326 and 328 are connected to the lines 318, 320 and 322 respectively. Also connected to the opposite sides of the relay coils by lines 332, 334 and 336 are the fixed contacts of the relays. The movable contacts of the relays 324, 326 and 328 are connected by lines 338, 340 and 342 respectively, to the memory cam contacts of the master controller cam unit, the opposite sides of which are connected to a ground feed line 344.

As seen in FIGURE 8, each of the coils of relays 324, 326 and 328 are connected in series with the coils of the permissive relays 72, 76 and 78 respectively, of the permissive circuit. The resistance of the coils of the relays 72, 76 and 78 is much greater than that of the coils of the detector relays so that the greatest proportion of the 12 volt drop will appear across the relays 72, 76 and 78 normally energizing these relays.

Where, however, there is a vehicle call in on the master controller the detector of the particular movement receiving the vehicle actuation will place a ground feed on the line between the two relays and at the same time will cause energization of the particular detector relay and the master controller memory circuits will hold this ground feed between the two relays until the call is answered.

The opposite sides of the coils of the relays 72, 76 and 78 are connected by line 346 to a ground feed thereby preventing the relays from being energized until the ground feed placed on the detector sides of the relays is removed.

If there are no calls on the master controller detector circuits relays 72, 76 and 78 will remain energized and their armatures will remain in the position shown in FIGURE 8 wherein the armatures 92, 96 and 98 of relays 72, 76 and 78 are connected by line 348 to a hot feed.

Each of the armatures 92, 96 and 98 completes a circuit from the hot feed line 348 through the coils of blocking relays 80, 82 and 84 by the lines 350, 352 and 354 respectively the opposite side of the coils of these relays being connected by line 356 through the armature contact 68 of relay 64 to a ground feed 358 thereby energizing the relays 80, 82 and 84.

Thus, it will be seen that in the normal condition that is when no vehicles have actuated the detectors in the movements controlled by the master controller, the permissive relays 72, 76 and 78 and the blocking relays 80, 82 and 84 are all energized, which, by means to be next described, permits the minor movement controller to again repeat its cycle of operation if there has been another actuation of detector 22.

When the minor movement controller has completed its cycle of operation, the relay 64 of the second timer will be energized thereby moving the contact 68 to the upper fixed contact away from the position shown in FIGURE 8. This breaks the ground side of the circuit which normally maintains the blocking relays 80, 82 and 84 energized. If at this point, or prior thereto, one of the detectors 300, 302, or 304 has been actuated, one or more of the blocking relays 80, 82 or 84 will be prevented from being de-energized when the armature 68 of relay 64 returns to the position shown in FIGURE 8 at the end of the timing interval controlled by the second timer. This de-energization of one or more of the blocking relays, as the case may be, suspends the operation of the minor movement controller until the calls on the movements controlled by the master controller have been satisfied.

Figure 9:
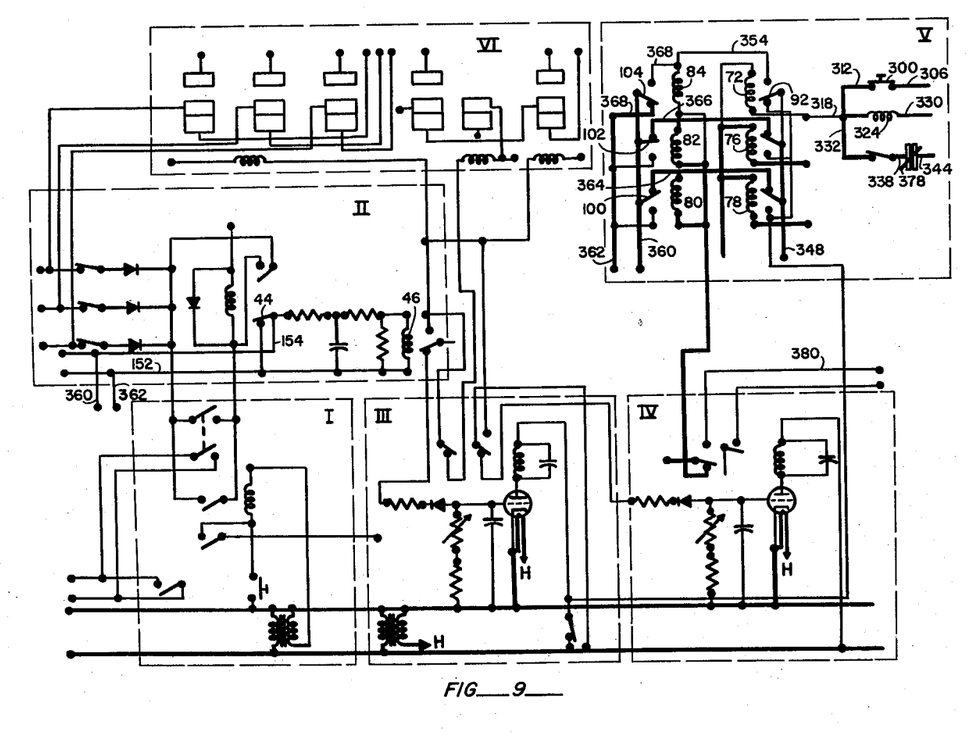

Referring now to FIGURE 9, an example of the operation of the permissive circuit when one of the movements controlled by the master controller has received a detector actuation will be described. In FIGURE 9 detector 300 has been shown as being actuated thereby connecting a ground feed by line 306 to the line 312 which in turn is connected to the line 318 between the relay 72 and the relay 324 thereby placing both sides of the coil of relay 72 at ground potential and de-energizing the relay 72.

When the relay 72 is de-energized the relay 84 is prevented from being energized at the end of the minor movement controller cycle by virtue of the fact that the circuit from the hot feed through line 348 and the armature 92 of relay 72 to line 354 has been broken as shown in FIGURE 9.

The de-energization of blocking relay 84 returns the armature of the relay 104 to the position shown in FIGURE 9 thereby completing a circuit from line 360 through the armature 104 and the back contact of relay 84 to line 362. Referring now briefly to FIGURE 2, the line 360 is connected to the line 154 and the line 362 is connected to the line 152 whereby when the armature 104 of relay 84 completes the circuit between lines 360 and 362 relay 46 of the minor movement controller is shunted by a circuit comprising the master controller timing tube 142 which is connected at one side to ground, line 144, coil 138 of relay 134, line 144, line 148, cam units stop contacts 150 which are closed during the amber intervals of the movements controlled by the master controller and line 152, line 362, armature 104 of relay 84, line 360 to line 154 which is connected to a hot feed. This energizes relay 134 of the master controller thereby energizing the cam unit motor 130, as previously described, thus cycling the master controller through the amber unit and into the green, or proceed signal display to the movement receiving the detector actuation, which in this example is the street in which the detector 300 has been placed.

As will be obvious, de-energization of any of the relays 72, 76 and 78 by actuation of the respective detectors 300, 302 and 304 will in turn de-energize the respective relays 80, 82 or 84, thus completing the shunt circuit just described through the armatures 100, 102 and 104 of the blocking relays thereby preventing operation of the minor movement controller until all of the calls on the master controller have been satisfied.

When the master controller has cycled to present the proceed signal display to the movement receiving the detector actuation the master controller memory contacts will open thereby de-energizing the particular detector relay. With reference to FIGURE 9 by way of example, the memory cam contacts 378 will open thereby de-energizing relay 324 removing the ground feed from line 344, closed contacts 378, line 338 and line 332 to line 318. As previously described, the 12 volts hot feed on line 330 is again connected through line 318 to the coil of relay 72 thereby re-energizing this relay. Through circuits previously described, the re-energizing of relay 72 re-energizes the blocking relay 84 thereby moving the armature 104 from the position shown in FIGURE 9 to that shown in FIGURE 8, thus disconnecting the shunt circuit between line 360 and 362 thereby permitting the minor movement controller to be cycled if there has been an actuation of detector 22. Actuations of the detector 22 during the time in which the blocking relays are de-energized will be "remembered" through memory circuit described in connection with the description of FIGURE 2.

When the blocking relays 80, 82 and 84 have all been re-energized upon completion of the call, or calls on the movements controlled by the master controller, the relays are maintained in the energized state, even though the detectors 300, 302 and 304 may be again actuated, in order to permit the operation of the minor movement controller when the calls on the master controller have been satisfied. The circuit for maintaining the blocking relays in this energized state consists of line 360 which is connected to a hot feed through line 154, the armature 100, 102 or 104 and upper contact of the energized blocking relay line 364, 366 or 368, and the coil of the relay to line 366 which is connected through the armature 68 of relay 64 to a ground at 358.

Non-Selective Operation

Unless there is a call on either of the two movements controlled by the master controller, the right of way signal display will be transferred from the movement on which the master controller was resting prior to the operation of the minor movement controller, to a movement controlled by the master controller, upon completion of the minor movement controller cycle of operation, in a descending order. For example, if the master controller right of way signal display was being presented to movement Number One, as described in connection with FIGURE 3, prior to the actuation of the minor movement controller upon completion of the operation of the minor movement controller, the right of way signal display will be transferred to movement Number Three. Where, however, there has been a call on either of movements Two or Three, the right of way signal display will be transferred directly to that movement.

A selective feature of the minor movement controller is such that it may be set or arranged so that specific movement will be given the right of way signal display following the operation of the minor movement controller regardless of the vehicle actuations received by the other movements controlled by the master movement controller. With reference to FIGURE 6, this is accomplished by connecting line 380 to the detector circuit at lines 318, 320 or 322 in FIGURE 8 of the movement to which it is desired to next present the right of way signal display. The line 380 is connected via line 318, 320 or 322 as the case may be through the armature 68 of relay 64 to the ground feed at 358 thereby connecting the coil of the detector relay of the desired street to the 12 volt hot feed line 330 which causes the relay to be energized when the armature 68 of relay 64 is moved into the position shown in FIGURE 6, for example, thus simulating a vehicle detection which causes the master controller to cycle to present the right of way signal display to that movement.

Another selective feature of the minor movement controller is such that the minor movement controller may be arranged to operate only after the clearance signal display has been presented to a pre-selected movement controlled by the master controller regardless of the point in the master controller cycle of operation at which the detector 22 of the minor movement controller has been actuated. This is accomplished through the selector switches 34, 36, and 38 of the selector circuit shown in section II. By way of example, if it is desired to have the minor movement controller follow only movement Two of the master controller, the switch 36 is closed and switches 34 and 38 are opened thereby removing the hot feed from lines 182 and 186 through the switches 34 and 38 when the clearance signal display is presented to movements Number One and Number Three of the master controller which in turn prevents the operation of relay 40 during the clearance signal display of these movements thereby preventing the operation of the minor controller after these movements.

Figure 10:
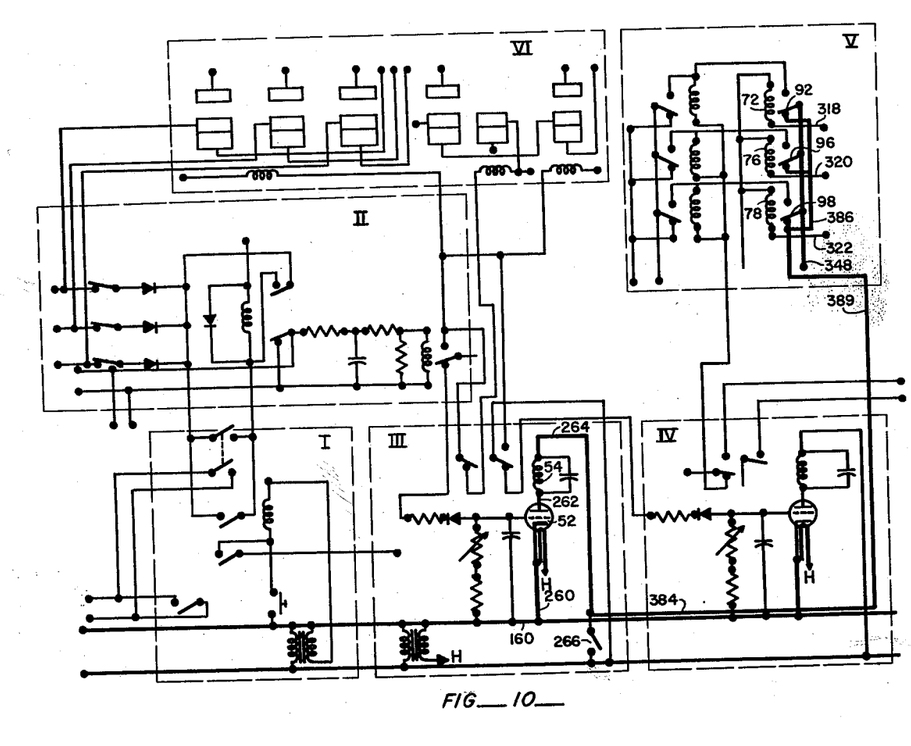

Another selective feature of the minor movement controller is such that the controller may be arranged so as to normally maintain the first or proceed signal indication of the minor movement control in the energized state until there is a call on one of the movements controlled by the master controller. This condition is achieved by the cycle-stop switch 266 located in the line 264 connected to the plate of the first timer control tube 52. The opposite end of line 264 is connected to the hot side 166 of the power supply. When the switch 266 is moved to the closed cycle position, as shown in FIGURE 5, and as described in connection therewith, the first timer will time out in the normal manner previously described in connection with the description of the non-selective operation of the controller thereby energizing the relay 54 so as to commence the timing of the interval controlled by the second timer of Section IV. If, however, the switch is moved to the open or stop position, as shown in example in FIGURE 10, the plate circuit described in connection with FIGURE 5 is thus broken. Accordingly, interval one will time out in the normal manner but no current will flow in the plate circuit because of the opening switch 266. Instead, the plate circuit is now completed through a circuit comprising line 260 connected to the common power supply line 160, tube 52, line 262, coil of relay 54, line 264, lines 384 and 386 to which the lower contacts of the relays 72, 76 and 78 are connected. As previously set forth, the coils of relays 72, 76 and 78 are normally energized so as to maintain the armatures 92, 96 and 98 of these relays in the upper position, the energization of relays 72, 76 and 78 being effected by the connection of the coils of these relays through lines 318, 320 and 322 respectively, to the detector relay circuits described in connection with FIGURE 8 of the master controller. Consequently, the plate circuit of the first timer will not be complete unless and until the detector of any of the movements controlled by the master controller is actuated. As previously set forth, this actuation will de-energize the permissive relays 72, 76 or 78 which is connected to the particular detector relay energized by the detector actuation. The de-energization of the particular relay 72, 76 or 78 causes the armature of that relay to move to the position shown in FIGURE 10 thereby connecting the line 386 to the line 348, which is connected to a hot feed thereby completing the plate circuit of the first timer and permitting relay 54 to become energized thus moving the minor movement controller from interval one to interval two and to the master controller movement called by the detector relay actuation as previously described. In FIGURE 10, the circuit just described has been shown wherein each of the detectors of the movements controlled by the master controller has been actuated thus causing the de-energization of each of the relays 72, 76 and 78 thereby completing the plate circuit of the first timer through each of the lower contacts of these relays.

A final selective feature of the minor movement controller comprising the preferred embodiment of this invention is such that the controller may be arranged to come into sequence with the master controller without any actuation thereby permitting the minor movement controller to add a fourth movement or phase to the three movement master controller.

Figure 11:
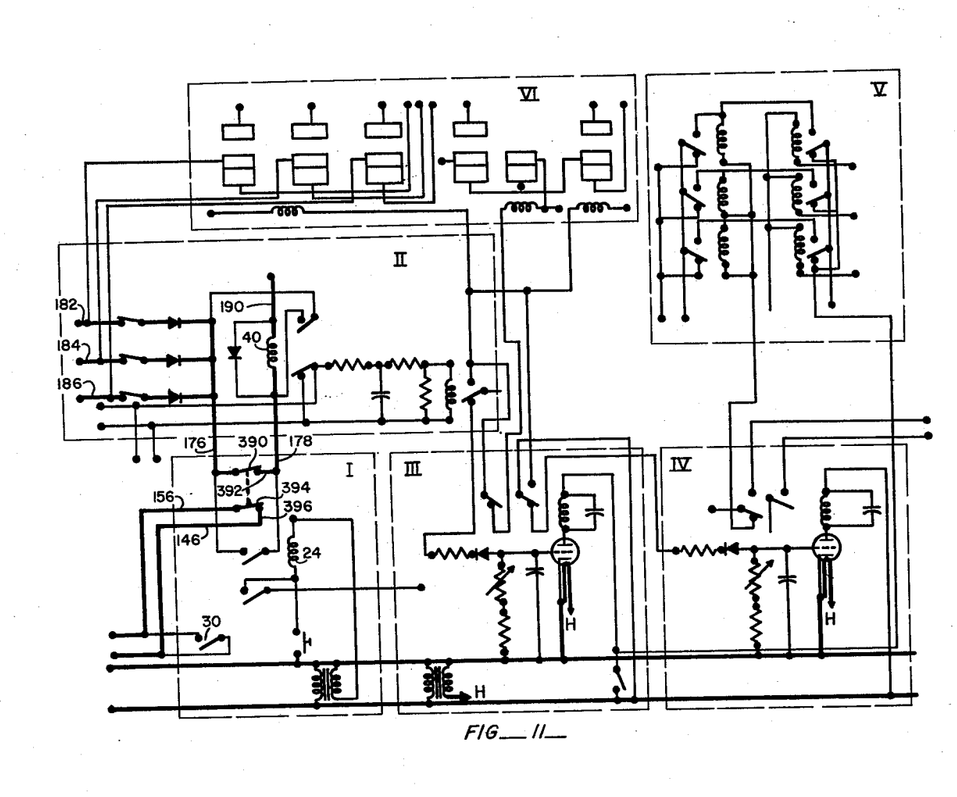

With reference to FIGURE 11, this feature is achieved by a recall switch 390 positioned in the line 392 connected across the lines 176 and 178 of the selector circuit of section I of the minor movement controller. The recall switch 390 is ganged to a switch 394 connected in line 396 across lines 146 and 156 of the detector circuit shown in section I of the controller. When the switches 390 and 394 are moved to the closed position, as shown in FIGURE 11, the contacts 30 of relay 24 are shunted by a circuit comprising line 146, line 396, switch 394, and line 156 thereby permitting the energization of relay 40 of the selector circuit whenever a hot feed is placed on any of the lines 182, 184 and 186 by the master controller, as described in connection with FIGURE 3. Cycle-stop switch 266 is moved to the open or stop position as described in connection with FIGURE 10 when the recall switch 390 is moved to the closed position.

When the master timer cycles from the proceed indication on one of the movements in which it is resting to the clearance indication, a hot feed is placed on the proper line 182, 184 or 186 depending upon the clearance signal which is energized. This hot feed energizes the relay 40 of this selector circuit, as previously described which in turn energizes the first signal of the minor movement controller. As set forth in connection with FIGURE 10, the minor movement controller, due to the fact that the cycle-stop switch is open, or in the stop position, now halts with the first signal energized. The minor movement controller will remain in this position unless and until one of the detectors mounted in the movements controlled by the master controller is actuated. Thereupon as described in connection with FIGURE 10, the plate circuit of the first timer of the minor movement controller will be completed permitting this timer to time out and to energize the second timer which presents the clearance signal to the minor movement. Upon completion of the timing of the clearance signal, the master controller is cycled in the manner previously described to present the proceed indication to the movement receiving the detector actuation. Upon completion of the timing of the proceed indication to this movement the closed switch 394 completes a circuit between the lines 146 and 156 connected to the master timer, as shown and described in connection with FIGURE 2, thereby cycling the master timer to present the clearance signal to the movement receiving the detector actuation. Thereafter, as just described the minor movement controller is energized to return the proceed indication to the minor movement where it remains until there is a reliable actuation on one of the movements controller by the master controller.

What I claim is:

1. An actuated minor movement controller for controlling an auxiliary traffic movement at the intersection thereof with two or more main traffic movements, said minor movement controller having auxiliary detector means and being operable in conjunction with a multi-phase parent controller for controlling the traffic on said two or more main movements, said parent controller including a power supply, a detector circuit individual to at least one of said main movements, and main proceed, clearance and stop traffic signals individual to each movement controlled by said parent controller, a cam unit for cyclically energizing said main traffic signals, timing means and control means normally responsive to energization of said detector circuit in response to actuation of detector means in said detector circuit, said timing and control means being operable in response to actuation of said detector means associated with said auxiliary movement to cycle said cam unit to a position wherein said cam unit supplies a hot feed for a pre-determined time controlled by said timing means in said parent controller to one of said parent clearance signals, said hot feed being normally completed through said minor movement controller to said parent clearance signal, said minor movement controller having proceed, clearance and stop signals associated with said auxiliary movement, a detector circuit operable upon actuation of said auxiliary detector means to connect said hot clearance feed in said minor movement controller to a selector circuit to energize said selector circuit, said selector circuit being operable when energized to suspend the operation of said parent controller upon completion of the timing of said hot feed to said main clearance signal, said selector circuit being further operable to energize a signal circuit in said minor movement controller to connect said hot feed to the stop signal for said main movement and to energize the proceed signal for said auxiliary movement and initiate timing means in said minor movement controller, said timing means being operable to control the interval of energization of said proceed signal, de-energize said proceed signal upon completion of said interval and energize the auxiliary clearance signal and time the interval of energization of said clearance signal, said last mentioned timing means being further operable upon completion of said clearance interval to energize said control means in said parent controller to cycle said cam unit to a next position wherein said clearance hot feed for said parent signal is opened thereby de-energizing said selector circuit, de-energizing the auxiliary clearance signal, energizing the stop signal for said auxiliary movement, and re-setting said timing means in said minor movement controller.

2. The minor movement controller of claim 1, wherein said minor movement controller includes a permissive circuit operative upon completion of the timing interval for said auxiliary clearance signal to sample each detector circuit of the main timer, said permissive circuit being operable where there is an actuation of one of said detector circuits of said main timer to shunt said selector circuit in said minor movement controller to suspend operation of said minor movement controller until said main timer detector circuit becomes de-energized.

3. The minor movement controller of claim 1, wherein said minor movement controller is operable in combination with the present controller to return the right-of-way signal display to any of the movements having an actuation controlled by said parent controller except the movement on which the parent controller was resting prior to the actuation of the detector circuit of said minor movement controller.

4. The minor movement controller of claim 1, wherein the selector circuit includes means for rendering said circuit operative only after a preselected movement controlled by the parent controller has received the clearance signal display.

5. The minor movement controller of claim 1, wherein said controller includes means for returning the right-of-way signal display to a preselected movement controlled by said parent controller except the movement on which the parent controller was resting prior to the actuation of the detector circuit of said minor movement controller.

6. The minor movement control of claim 1, wherein said minor movement controller includes means for retaining the right-of-way signal display on the auxiliary movement controlled by the minor movement controller until a call is received on one of said movements controlled by said parent controller.

7. The minor movement control of claim 1, wherein said minor movement controller includes means for retaining the right-of-way signal display on the movement controlled by the mnior movement controller until a call is received on one of said movements controlled by said parent controller, said means being operable to return the right-of-way signal display to the minor traffic movement after said call has been satisfied.

References Cited in the file of this patent
UNITED STATES PATENTS

| | | |
|---|---|---|
| 2,145,031 | Renshaw | Jan. 24, 1939 |
| 2,542,978 | Barker | Feb. 27, 1951 |
| 2,751,574 | Jeffers | June 19, 1956 |
| 2,834,001 | Wilcox | May 6, 1958 |
| 2,883,643 | Du Vivier | Apr. 21, 1959 |

UNITED STATES PATENT OFFICE
CERTIFICATE OF CORRECTION

Patent No. 3,078,440

February 19, 1963

Arthur E. Hilliker

It is hereby certified that error appears in the above numbered patent requiring correction and that the said Letters Patent should read as corrected below.

Column 12, line 62, for "present" read -- parent --; column 13, line 13, for "mnior" read -- minor --.

Signed and sealed this 24th day of September 1963.

(SEAL)
Attest:

ERNEST W. SWIDER
Attesting Officer

DAVID L. LADD
Commissioner of Patents